July 10, 1934.  H. C. BOSTWICK  1,966,087
TIRE MACHINE STRIP FEEDING APPARATUS
Filed Feb. 15, 1933
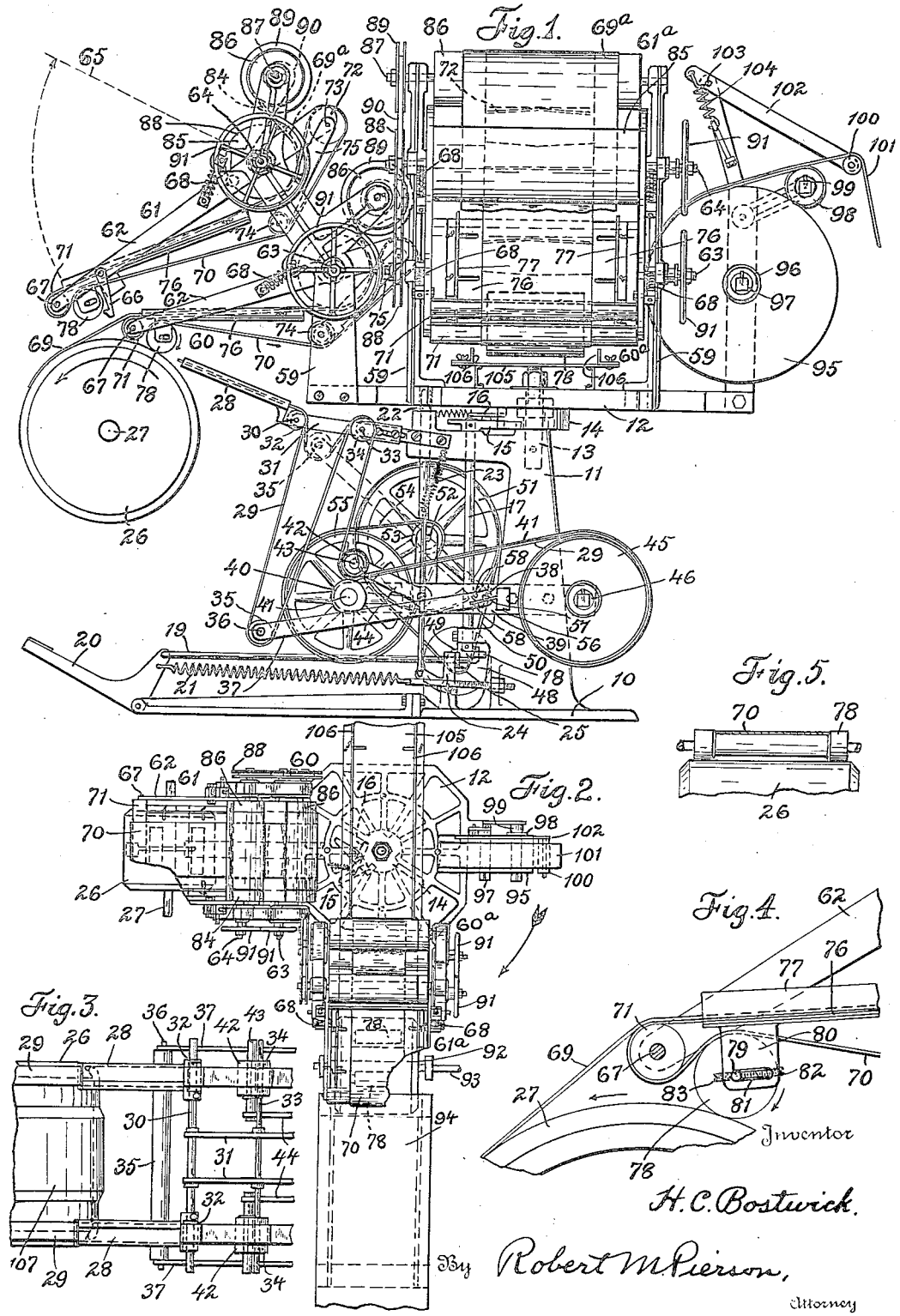

Patented July 10, 1934

1,966,087

UNITED STATES PATENT OFFICE 1,966,087

TIRE MACHINE STRIP-FEEDING APPARATUS

Henry C. Bostwick, Akron, Ohio, assignor to The Akron Standard Mold Company, Akron, Ohio, a corporation of Ohio Application February 15, 1933, Serial No. 656,841

9 Claims. (Cl. 154—10)

This invention relates to strip-feeding apparatus for tire building machines and is especially adapted for semi-flat or drum-built tire bands, although not wholly restricted thereto.

My general object is to increase the speed of delivery of strip material to the band-building form or drum, so that the number of tires produced by an operator in a given time may be substantially increased. This applies especially to the delivery of the body fabric and in some degree also to a faster or more convenient means for supplying other strips, such as chafers and other side strips, breaker strips and treads. The invention not only provides faster feeding units, particularly those for the body or carcass fabric, but also a new arrangement of a plurality of those units and a new combination of such units with other units on a stock turret or the like.

The invention involves an improved combination of strip-feeding with strip-storing and receiving devices and a further combination of such devices with power means for recharging the storage devices.

Of the accompanying drawing, Fig. 1 is a side elevation of tire band-building apparatus including strip-feeding means constructed in accordance with my invention, omitting the carcass strip splicing table and power in-feed shown in Fig. 2.

Fig. 2 is a plan view, partly broken away, on a smaller scale.

Fig. 3 is an enlarged plan view of a portion of the edge-strip feeder and the drum with a tire band partly built thereon.

Fig. 4 is an enlarged detail side elevation, showing the delivery end of one of the carcass strip feeders in its operative relation to the drum, this view being a partial section.

Fig. 5 represents a detail front elevation, partly in section, illustrating a modified belt-driving friction roller.

In the drawing, 10 is a base formed with a standard or pedestal 11, at the upper end of which a stock turret 12 is mounted to turn on a fixed vertical pivot pin 13 to any one of four positions. The number of positions may be increased or diminished accordingly as corresponding numbers of stock-supplying units may require different positions. For rotating the turret from one position to the next, the under side of its base is provided with a ratchet hub or wheel 14 with which engages a positively-actuated arm or stop-pawl 15 pivotally carrying an eccentrically-mounted, spring-projected feed-pawl 16 which engages teeth of the ratchet wheel 14 above those engaged by the stop-pawl. The pawl or arm 15 is attached to the upper end of a vertical rock-shaft 17 whose lower end carries an arm 18 engaged by one end of a sliding rod 19 whose other end is connected with the short arm of a pedal-lever 20 normally retracted by a spring 21 to raise the long arm carrying the pedal of said lever. Additional stop means is provided for the turret, consisting of a vertically-slidable pin 22 elevated by a spring 23 to enter its upper end in a socket in the base frame of the turret 12, said pin being retractible by connecting an extension from its lower end with one arm of a lever 24 pivoted on the base 10, the other arm of said lever engaging a collar 25 attached to the rod 19, whereby said lever is actuated by the rod, and also serving as a support and guide for the inner end of the rod. While a horizontally rotatable turret is shown, the invention is not wholly limited thereto.

26 is the usual tire-building form or drum mounted above the pedal 20 upon a horizontal power-driven shaft 27 and adapted for association with the several strip-supplying devices carried by the turret 12 as well as with the edge-strip feeder carried by the base pedestal 11.

Describing first the edge-strip feeder, it includes a pair of elongated guides 28 for side or edge strips 29 which may, for example, be the chafer strips of rubberized, bias-cut, woven fabric applied over the beads of the tire band which has been built upon the drum 26 as indicated in Fig. 3. The forward ends of these guides 28 are positioned in a tangent direction with relation to the drum adjacent the edges of the latter and their rear ends are carried by a non-rotatable rod 30 on which the guides may be angularly adjusted to vary the elevation of their free ends, and said rod is in turn carried by a pair of arms 31 whose inner ends are fixed on a lateral arm of the pedestal 11, said arms 31 being in two sections having a telescopic adjustment which, in connection with the angular adjustment of the guides 28, enables the latter to be adusted to drums of different diameters and properly positioned to deliver the chafer strips.

On the rod 30 are loosely journaled a forward pair of guide rollers 32 for the respective chafing strips 29, and on another rod 33 carried by the arms 31 are loosely journaled a rear pair of guide rollers 34 for said strips. Between the rollers 32 and 34 each strip is downwardly looped in a bight of variable length, the lower bend of which supports a floating tension roller 35, the ends of one roller or roller structure serving for both strips. Roller 35 is carried by a swinging frame including a bearing rod 36 which passes through the roller and a pair of side arms 37 freely pivoted at 38 upon horizontal fixed frame members 39 attached to the pedestal 11.

For intermittently propelling the chafer strips substantially without tension, I provide a pair of soft rubber friction rollers 40 against each of which the corresponding strip 29 and an overlying liner 41 therefor are held by a liner rewind roller 42, which is loosely journaled on and removable endwise from a bearing pin 43 carried at the outer end of an arm 44 whose inner end is pivoted to the frame member 39. Each combined chafer strip 29 and liner 41 unwinds from a storage roll 45 whose core is removable endwise from a bearing arbor 46 carried by the frame member 39.

The rubber friction rollers 40 are mounted at the ends of a shaft 47 which is driven through a reduction belt-and-pulley gearing by an electric motor 48 supported on the pedestal 11, 49 being a small driving pulley on the motor shaft, 50 a belt connecting it with a larger pulley 51 on a countershaft 52, and 53 being a small pulley on said countershaft connected by a belt 54 with a large pulley 55 on the shaft 47.

For automatically cutting in and out the motor 48 according to the position of the tension roller 35, I provide an electric switch 56 in a stationarily-mounted casing, having the necessary electrical connections (not shown) with the motor and with a source of current and also having a snap-arm 57 engageable by one or the other of a pair of pins 58 on one of the frame arms 37 which carry the tension roller.

When the motor 48 is operating, it feeds out the strips 29 by means of the friction rollers 40 at a faster rate than they are taken up, and their bights become elongated or drawn downwardly by the tension roller 35. As said roller approaches its lowermost position, the upper one of the pins 58 flips downwardly the snap-arm 57 of the switch 56, opening said switch and stopping the motor 48. Then as the strips are fed out upon the drum 26, the bights shorten, the tension roller 35 rises and as it approaches its uppermost position shown in broken lines in Fig. 1, the lower pin 58 flips the snap-arm upwardly, closing the switch and starting the motor again to resume the fabric feed. In this manner, the strips 29 may be paid out at a rate independent of their rate of feed from the roller 45, and the feed will be intermittently maintained in an automatic manner, with the excess fed into and taken out of the storage bights without attention on the part of the operator and without imposing any substantial stretching tension upon the strips, the weight of the roller 35 and its frame being insufficient materially to stretch the fabric.

At each of two positions 90 degrees apart on the turret 12, I mount a plurality, two in this instance, of strip-feeding units for supplying the body fabric, such as rubberized, bias-cut cord fabric, upon the building drum 27. Each pair of units is supported by upright frame standards 59 at one edge of the turret, in such manner that the individual units may be alternatively brought into feeding relation with the drum at points spaced along the circumference of the latter, and the units are positioned one above the other.

In Figs. 1 and 2, 60 denotes generally the lower feeding unit having its delivery end at the inner or rear position, with relation to the drum, and 61 denotes the upper unit having its delivery end in the forward or outer position. This pair of units is the first to be positioned over the drum for supplying respective fabric strips having their diagonal threads running in opposite directions for the inner carcass plies. The outer carcass plies, which will generally be of different width than the inner ones, are supplied by a similar pair of feed units 60ª, 61ª placed in a different angular position on the turret, such as 90 degrees from the first pair of units, so that, by a clockwise indexing movement of the turret as indicated by the arrow in Fig. 2, the second pair may be brought over the drum after the inner plies have been laid. Thus a tire band of four or a greater number of carcass plies may be built upon the drum. For a 6-ply tire, for example, the first and third plies could be supplied by the unit 60, the second by the unit 61, the fourth and sixth by the unit 60ª and the fifth by the unit 61ª. Similarly an 8-ply tire could be built by the two pairs of units where permitted by the strip widths employed therein, and if a greater number of strip widths than can conveniently be supplied in this manner is desired, the number of units or groups of units can be increased at suitable positions on the turret.

The units 60 and 61 are in most respects duplicates of each other except for length, and the same is true of the units 60ª and 61ª. Each includes a stock-storage roll and a liner take-up roll, together with means for driving the latter from the periphery of the drum 26, which means as here shown is a previously-known device, namely an endless feeder belt or apron whose under side is driven by a friction roller contacting with the drum, but the invention is not wholly limited to the employment of such a device. In the machine here illustrated, each feed unit includes a rectangular frame made up of side bars 62 and connecting cross rods and pivoted to the turret standards 59 on respective pairs of trunnions centered at 63, 64, so that the delivery ends of the units may be independently swung down into feeding relation with the drum 26 or raised out of operative position. To afford the operator free access to the fabric supplied by the lower unit 60 during operation of the latter, the upper unit may be swung substantially to the inoperative position indicated in Fig. 1 by the broken line 65. The lower unit has a normal swinging movement of smaller amplitude, and when raised away from the drum while the upper unit is in operation, the delivery end of said lower unit may be supported from the upper unit by a pair of hooks 66 pivoted to the frame-bars 62 of the upper unit near the delivery end and adapted to engage the extended ends of the frame-rod 67 of the lower unit upon which the latter's delivery roller turns. Further provision is made for yieldingly holding the respective feed units in either their operative positions or their widely-swung inoperative positions, by means of over-center spring toggle devices 68 mounted in pairs with members at each side of the respective units, each member including a rod pivoted to the frame bar 62, slidable through a pivoted block on the turret standard 59 and surrounded by a spring interposed between said block and the pivot base of the rod.

The carcass strip supplied by the lower unit is indicated at 69 and that supplied by the upper unit at 69ª. Each unit includes an endless feed belt 70 passing around an idle delivery roller 71 which is journaled on the cross-rod 67 at the forward end of the unit, and around a rear idle roller 72 at the inner end journaled on a cross-rod 73, and its lower stretch is tensioned by a roller 74 journaled at the ends of a pair of arms 75 which are pivoted on the projecting ends of the rod 73. The fabric strip 69 or 69ª, which is somewhat wider than the belt 70, is fed to the drum over the upper stretch of said belt and its projecting margins sustained by a guide-plate 76 supported from the frame-bars 62 and having laterally-adjustable guiding flanges 77.

The belt 70 is driven by the outer periphery of the drum 27, or the tire material which has been wrapped thereon, at a surface speed bearing a predetermined relation to that of the drum, by means of a soft rubber friction roller 78 freely journaled on the under side of the feed unit adjacent the delivery roller 71 and having a length approximating the width of the belt or slightly less. The trunnions 79 of said friction roller may be supported by ears 80 depending from the under side of the guide-plate 76 and are adjustable tangentwise of the drum in slots 81 in said ears and their position fixed by stop-screws 82, 83. The upper side of the roller 78 is shown in driving engagement with the lower stretch of the belt 70 to provide a delivery speed of the fabric strip 69 the same as the surface speed of the drum and thus to supply the fabric upon the drum without tension, but if it were desired to impose a tension upon the middle of the fabric to stretch the latter over the crown of the drum while its margins remain unstretched, the drum-contacting roller 78 could obviously be geared to a belt-driving roller in accordance with a known arrangement for feeding strip material on a liner to a tire core, or the roller 78 could have a larger diameter at its ends for contacting with the drum and a reduced diameter in the middle for contacting with the belt as illustrated in the modification shown in Fig. 5.

In each feed unit there is associated with the upper stretch of the belt 70 a combined stock and liner reeling device which may have the construction described in my application Ser. No. 637,370, filed Oct. 12, 1932. Said device is characterized by a permanently-mounted liner 84 having its ends attached to and adapted to wind in opposite directions upon the drum or core of a liner rewind roll 85 which here turns upon the center 64 formed by a shaft fixed to said core and passing through bearings on the turret standards 59, and upon the drum or core of a combined liner and stock roll 86 which is fixed to a shaft 87 journaled in bearings on said standards, together with a pair of narrow, deep-flanged pulleys 88, 89 fixed upon the respective shafts 64 and 87 and a spring-steel tape 90 attached to said pulleys and having its ends coiled in variable amounts around the respective shafts in opposite directions to the winding of the liner for providing a substantially constant tension upon said liner under all conditions. The stock roll 86 turns freely or without substantial resistance in response to the pull of the liner 84. The lower roll 85 is driven by the upper stretch of the belt 70 running in contact with the fabric strip over a substantial arc of said roll, and as fast as the fabric is fed out upon the belt from the roll 86, the liner separates therefrom and is wound into the roll 85.

Each of these reeling devices holds enough strip stock for the ply or plies of several tires adapted to be made with that particular strip. For feeding fresh stock into the reeling device, the latter, together with the corresponding belt 70, is reversely operated either by hand or by power. Thus a hand-wheel 91 is shown attached to one end of each of the shafts 63 and 64 which, upon being turned counterclockwise as viewed in Fig. 1, will reversely propel the belt 70 and carry the previously spliced strip stock, laid upon the upper stretch of the belt, rearwardly partly around the roll 85 from which the liner is being unwound, and interwind it with the liner upon the roll 86. The stock is thus stored in the reeling devices of the respective feed units 60, 61 or 60ª, 61ª when the turret 12 is in a position placing a pair of said units away from their position over the drum, preferably in the preceding quadrant, as shown for the position of the units 60ª, 61ª in Fig. 2.

For a power in-feed, the hand-wheels 91 are not used and could be omitted. Such a power in-feed is represented in Fig. 2 in the form of a drum 92 having a power-driven shaft 93 mounted in suitable bearings below the inner end of a stock-splicing table 94 and adapted to drive the belt-propelling friction rollers 78 of the respective feed units just as they are driven by the tire-building drum 26, but in a reverse direction.

The described strip-feeding unit, including a drum-driven feed belt and a belt-driven reeling device, enables the stock to be fed to the drum 26 at a greatly increased speed as compared with previously known means and without any undesired tension.

In the third quadrant of the turret as viewed in Figs. 1 and 2, there is mounted a feeder for supplying a strip of breaker fabric, which may be in one or more plies, to go over the carcass on the drum 26 preparatory to applying the rubber tread thereto. This feeder may be of any suitable character, for example, including a roll 95 of combined rubberized breaker fabric and liner, having a tubular core 96 mounted on a pin or arbor 97 and withdrawable endwise therefrom, together with a liner rewind roll 98 having a core similarly mounted on a pin 99, and an idle roller 100 for guiding the breaker strip 101 upon the tire drum, said roller being carried by the long arm of a lever 102 pivoted at 103 and having a tension spring 104 attached to its short arm.

In the fourth quadrant of the turret is located a pan 105, of a length adapted to reach the upper side of the drum 26 when positioned over the latter, and provided with laterally-adjustable side flanges 106 for supporting and guiding the rubber tread 107 which is shown applied to the carcass upon the drum in Fig. 3, said tread being sometimes wide enough to include also the side covering outer rubber of the tire. This pan is here shown in a horizontal position, but might have its rear end elevated to place it in an inclined position, and it may support a single tread or be constructed to support a plurality of treads.

In the operation of this machine, the reeling devices of the fabric feeders 60, 61, 60ª, 61ª having been charged with the necessary quantity of carcass fabric strip material for several tires, and a chafing-strip roll 45 and breaker-strip roll 95 mounted in the machine and their strips carried forward over the guiding devices, and a tread having been placed in the pan 105, the turret 12 is positioned as in Figs. 1 and 2 to bring the feeder units 60 and 61 over the drum. The leading end of the first carcass ply 69 from the feeder 60 is attached to the drum 26 as indicated in Fig. 1, and said drum is placed in rotation while the friction roller 78 is brought down upon said drum and the fabric rapidly fed out from the reeling device and over the belt 70 in the manner previously described.

When the first ply is completed, the drum is stopped and the fabric severed, the upper unit 61 is brought down from the position 65, the lower unit is raised and supported from the upper unit by the hooks 66 and the second ply is run on from the upper unit upon the first ply in a similar manner. If a third inner ply is then required for a 6-ply tire, it may be supplied from the lower unit 60. The covered bead-core rings, usually including flippers, are then applied to the last-laid inner carcass ply over the drum shoulders by suitable instrumentalities, and the edges of the carcass plies turned outwardly around the bead rings, after which the turret is rotated a quarter turn to bring the second set of carcass-strip feeders 60ª, 61ª over the drum, the outer carcass plies are successively run on and their edges turned inwardly at the beads. Then the turret is given another quarter turn to bring the breaker-strip feeder, including the rolls 95, 98, etc. over the drum, and the breaker strip is run on. The turret is then given a fourth quarter turn to bring the tread pan 105 over the drum and the rubber tread 107 is applied over the breaker and the carcass and may include rubber side strips, or the latter may be separately applied and guided by hand or may be fed and guided by a mechanism similar to that described for applying the breaker strip 101, and located on the turret or otherwise. Finally, the fabric chafer strips 29 are run on over the beads with the aid of the previously described feeding and guiding mechanism stationarily mounted under the turret on the base pedestal 11. After each strip is laid, it will be rolled or stitched down in the usual manner by hand tools or by tools mounted on the machine and not here illustrated. If gum cushion strips are required upon any of the fabric plies, they may be applied to the latter before said fabric plies are stored in the machine, or may be separately fed to the drum or to the appropriate fabric ply just before the latter runs onto the drum, by means of any suitable feeding and guiding devices.

As previously indicated, this machine, by speeding up the rate of strip application to the tire form, substantially increases the number of tires obtainable per operator in a given time, it produces better work by enabling the strips to be applied smoothly and without stretch or with a predetermined uniform tension, and it permits the carcass-strip feeders to be rapidly and conveniently recharged at comparatively long intervals without stopping the machine.

While a preferred construction has been described and illustrated, the form of embodiment may be considerably varied without departing from the invention as covered in the claims.

I claim:

1. A strip feeder comprising an endless carrier belt, a roller for supporting a loop of said belt at the delivery end of the feeder, a second roller for supporting a loop of the belt at the opposite end, a friction roller engaging the lower stretch of the belt adjacent the first-said roller and adapted for driving engagement by a band-building form, and strip storing means having a liner rewind roll driven by the upper stretch of the belt.

2. A strip feeder comprising an endless carrier belt adapted for delivering strip material to a band-building form, and strip storing means including a permanently-mounted liner, a liner rewind roll driven by the upper stretch of said belt, a second roll for interwinding the liner with the strip material, and a spring driving connection between the rolls for maintaining tension on the liner.

3. In a tire building machine, the combination of a rotary band-building form, a strip feeder adapted to coact therewith and including a frame having strip-guiding means and pivotally mounted for swinging it to bring said means into and out of action, and an over-center spring device connected with said frame for yieldingly holding the latter in either an operative or an inoperative position.

4. In a tire building machine, the combination of a rotary band-building form, a rotary stock turret having a strip feeder drivable by the form for association with said form in the strip-delivering position of the turret, a storage device associated with the feeder for supplying strip material to the latter in the delivering position and receiving the material therefrom in the receiving position of the turret, and power means for association with the feeder to reversely drive the latter and the storage device in the receiving position of the turret.

5. In a tire building machine, the combination of a rotary band-building form on a horizontal axis, edge-strip feeding means stationarily positioned with reference to said form for association with the latter, a stock turret rotatable on a vertical axis, and a plurality of body-strip feeders located on said turret in different positions about its axis above the level of said edge-strip feeding means for successive association with the form.

6. Strip-feeding apparatus for band-building machines comprising means for guiding a pair of edge strips, a liner rewind roller and an associated friction driving roller acting upon said rewind roller through the strip and liner, for each of said strips, means for supplying strip material and liners between said rollers, an electric motor for driving said friction rollers, a strip-controlled floating roller structure and pivoted frame carrying the latter, and a switch actuated by said frame for cutting in the motor drive in the advanced position of the floating roller structure and cutting it out in the retracted position of the latter.

7. In a tire building machine, the combination of a rotary band-building form, a stock turret rotatable on a vertical axis and having, in different angular positions about said axis, a plurality of carcass fabric feeders for successive association with the form and in another angular position a different strip feeder for association with the form, and in still another position a storing and guide pan for association with the form to supply a tread strip to the latter.

8. In a tire building machine, the combination of a rotary band-building form, a pair of feeders for alternatively delivering different strips to the same zone of the form, positioned one over the other, the upper one having a delivery portion for association with the form at a more advanced position circumferentially thereof than the lower one, and means for connecting the feeders to support the lower one out of action, from the upper one, when the upper one is in action.

9. In a tire-building machine, the combination of a rotary drum for substantially-flat band tire building, and means for feeding strip material substantially without tension to said drum comprising a turret carrying a plurality of alternatively-operating stock-feeding units, each unit having a liner, a liner-driven stock roll for interwound strip material and liner, and a liner rewind roll, and liner driving means including devices frictionally driven by the drum periphery or material thereon and adapted alternately to drive the liners on the respective rewind rolls for propelling said liners at the same surface speed as the material on the drum.

HENRY C. BOSTWICK.